United States Patent
Houlberg (10) Patent No.: US 9,586,276 B2
(45) Date of Patent: Mar. 7, 2017

(54) APPARATUS FOR TRANSVERSE CUTTING OF A CONTINUOUSLY MOVING WEB AND A METHOD THEREFORE

(75) Inventor: Jens Houlberg, Roskilde (DK)

(73) Assignee: Rockwool International A/S, Hedehusene (DK)

( * ) Notice: Subject to any disclaimer, the term of this patent is extended or adjusted under 35 U.S.C. 154(b) by 246 days.

(21) Appl. No.: 13/996,351

(22) PCT Filed: Dec. 6, 2011

(86) PCT No.: PCT/EP2011/071889
§ 371 (c)(1),
(2), (4) Date: Aug. 23, 2013

(87) PCT Pub. No.: WO2012/084490
PCT Pub. Date: Jun. 28, 2012

(65) Prior Publication Data
US 2013/0333536 A1    Dec. 19, 2013

(30) Foreign Application Priority Data

Dec. 20, 2010 (EP) .................................. 10195849

(51) Int. Cl.
| B23D 25/02 | (2006.01) |
| B26D 1/56 | (2006.01) |
| B23D 25/06 | (2006.01) |
| B23D 45/04 | (2006.01) |
| B23D 45/24 | (2006.01) |

(52) U.S. Cl.
CPC ......... *B23D 45/042* (2013.01); *B23D 45/046* (2013.01); *B23D 45/24* (2013.01); *Y10T 83/0515* (2015.04); *Y10T 83/4705* (2015.04); *Y10T 83/4749* (2015.04)

(58) Field of Classification Search
CPC .... B23D 45/042; B23D 45/24; B23D 45/046; Y10T 83/4705; Y10T 83/0515; Y10T 83/4749
USPC ... 83/37, 315, 303, 306, 310, 316, 318, 424, 83/428, 490
See application file for complete search history.

(56) References Cited

U.S. PATENT DOCUMENTS

| 1,746,594 A | * | 2/1930 | Jacobson | ...................... 83/471.3 |
| 2,534,977 A | * | 12/1950 | Kling | .............................. 83/306 |
| 3,057,240 A | * | 10/1962 | De Witt | ......................... 83/412 |

(Continued)

OTHER PUBLICATIONS

International Search Report (PCT/EP2011/071889) dated Dec. 29, 2011.

*Primary Examiner* — Ghassem Alie
*Assistant Examiner* — Bharat C Patel
(74) *Attorney, Agent, or Firm* — Dinsmore & Shohl LLP; Douglas Wathen (57) ABSTRACT

An apparatus for transverse cutting of a web has a frame straddling the web path, a side frame on each side of the web path and an upper frame between the two side frames, a circular saw blade suspended in a pendulum arm pivotably connected to the upper frame, a swinging drive for controlling the swinging movement of the saw blade, wherein the pendulum arm is pivotably mounted in a vertically movable sub-frame of the upper frame, and the vertical movement of the sub-frame relative to the upper frame is managed by a lifting drive that is coordinated with the swinging drive. Also disclosed is a method for transverse cutting a web.

4 Claims, 8 Drawing Sheets

(56) References Cited

U.S. PATENT DOCUMENTS

| | | | | |
|---|---|---|---|---|
| 3,308,700 | A | * | 3/1967 | Dedieu .......................... 83/311 |
| 3,379,227 | A | * | 4/1968 | Mason ........................ 83/471.2 |
| 3,413,881 | A | * | 12/1968 | Stolzer .......................... 83/486 |
| 3,709,096 | A | * | 1/1973 | Stender-Robertz ........... 409/183 |
| 4,454,794 | A | * | 6/1984 | Thornton ..................... 83/471.3 |
| 4,543,775 | A | * | 10/1985 | Horn et al. ..................... 56/235 |
| 4,572,580 | A | * | 2/1986 | Bieri ............................. 299/1.5 |
| 4,679,475 | A | * | 7/1987 | Antezana ........................ 83/420 |
| 5,544,557 | A | * | 8/1996 | Wierschke ........................ 83/37 |
| 6,212,983 | B1 | * | 4/2001 | Pyle ................................. 83/34 |
| 6,564,684 | B2 | * | 5/2003 | Bascom et al. ................. 83/105 |
| 6,923,101 | B2 | * | 8/2005 | Culpepper et al. ............ 83/75.5 |
| 8,978,531 | B2 | * | 3/2015 | Schaferling .................... 83/303 |
| 2002/0157513 | A1 | * | 10/2002 | Wierschke et al. ............. 83/174 |

* cited by examiner

Fig. 8

APPARATUS FOR TRANSVERSE CUTTING OF A CONTINUOUSLY MOVING WEB AND A METHOD THEREFORE

CROSS-REFERENCE TO RELATED APPLICATIONS

This application is the U.S. national stage of PCT/EP2011/071889 filed Dec. 6, 2011, which claims priority of European Patent Application 10195849.4 filed Dec. 20, 2010.

FIELD OF THE INVENTION

The present invention relates to an apparatus for transverse cutting of a web on a web path; and in particular, an apparatus comprising a frame straddling the web path having a base frame structure on each side of the web path and an upper frame between the base frame structures, at least one circular saw blade defining a linear cutting path generally transverse to a length direction of the web path, said circular saw blade being suspended in a pendulum arm pivotably connected to the upper frame so that the saw blade can swing in the plane of a linear cutting path, and swinging drive means for controlling the swinging movement of the at least one saw blade.

BACKGROUND OF THE INVENTION

When manufacturing mineral wool fibrous insulation material, the mineral fibres are produced in a continuous web which is then cut into slabs in a predetermined size by using a transverse cutting arrangement of the above-mentioned kind on the manufacturing line. An example of such transverse cutting arrangement with two circular pendulum saw blades is known from WO 2008/154902. Often the mineral fibre web moves at a constant velocity along the web path, and the cutting arrangement follows this movement during the cutting operation to ensure a orthogonal transverse cut.

In relation to the cutting of the web of mineral fibrous material into slabs, pendulum saws are advantageous since the transverse cut can be done in a single swing action across the web for a fast and reliable cut while the web is being advanced with a continuous velocity. However, a pendulum saw with a circular saw blade mounted on a swivel arm are generally limited to a certain web thickness. If the thickness of the web is increased above a certain value relative to the radius of the circular saw blade and the length of the swivel arm, the saw cannot cut the entire web. If a single pendulum saw is used there is also a limitation with regard to the width of the web. These limits may be widened by the provision of two pendulum saws such as described in WO 2008/154902.

The demand for mineral wool insulation products is calling for increasingly thicker insulation products in order to meet the insulation requirements in modern buildings. This causes a need to adapt the production equipment accordingly. Irrespective of whether the pendulum saw arrangement has one or two pendulum saw blades, if the web thickness is increased an increase of the diameter of the circular saw blade would extend the capacity of the transverse cutting arrangement and thereby solve a potential problem if the production line is to be adapted for the manufacture of a mineral wool fibrous product with an increased thickness.

The drawback, however, with this solution is that the weight and the moment of inertia of the saw blades are considerably increased. This requires larger equipment and thereby induces a substantial increase in the costs, in particular if the dimensions of a certain transverse cutting apparatus are reached and a new and bigger apparatus is required.

BRIEF DESCRIPTION OF THE INVENTION

An object of the present invention is therefore to provide a cutting apparatus for transverse cutting of a web, such as a web of mineral fibrous material, which reduces the above-mentioned drawbacks and which is suitable for transverse cutting a thick web.

The object is solved by an apparatus of the initially mentioned kind wherein the pendulum arm is pivotably mounted in a vertically movable sub-frame of the upper frame, and wherein the vertical movement of said sub-frame relative to the upper frame is managed by lifting drive means that is coordinated with the swinging drive means.

According to a second aspect of the invention, there is provided a method of transverse cutting a web on a web path, which method comprises the steps of providing a web; swinging at least one circular saw blade in a cutting path across the web path, preferably said cutting path being substantially orthogonal to the web path, where said saw blade is suspended in a pendulum arm which is pivotably arranged in a sub-frame; and moving said sub-frame in an upwards direction during the pendulum swing of the saw blade and thereby vertically shifting the pivot point of the pendulum arm during the pendulum swing of the saw blade.

By adding a second movement to the cutting action of the pendulum saw, the possible width and thickness of the web that can be cut is increased without having to increase the size of the saw blades. The combined movements of the pendulum swing and the vertical displacement of the pivot point of the pendulum arm during the swing allows for this increase in the sizes of the cross-section of the web which can be transverse cut by a transverse cutting apparatus according to the invention.

In a preferred embodiment, the upper frame comprises a vertically moveable sub-frame and a stationary upper frame and with lifting drive means controlling the vertical movement. The drive means may comprise an eccentric crank or hydraulic lifting means connecting the stationary frame portion and the moveable sub-frame. Hereby, the vertical movement may be effected and controlled in an easy manner.

The pendulum arm may preferably be mounted movably in the length direction of the web path, so that it can make a transversal cut in a continuously moving web. Hereby, the transverse cutting action can be carried out such that the resulting cutting line of a moving web may be orthogonal to the direction of the web.

By the invention it is found particularly advantageous that the at least one circular saw blade is adapted to swing from a first side position where the blade does not have contact to the web on the web path to a second side position where the blade does not have contact to the web on the web path, and wherein the sub-frame is in a lowermost position when the at least one saw blade is at either the first or the second side positions and that the sub-frame is moved to an uppermost position when the at least one circular saw blade is in its lowermost position, such as when the associated pendulum arm is in a substantially vertical position.

In a preferred embodiment of the invention, two circular saw blades are provided in a parallel pendulum swing configuration. The circular saw blades preferably swing in parallel and are provided with common drive source. Hereby, the transverse cutting apparatus may span cross a larger width of the web to be cut.

BRIEF DESCRIPTION OF THE DRAWINGS

In the following, the invention is described in more detail with reference to the accompanying drawings, in which.

DETAILED DESCRIPTION OF THE INVENTION

Figure 1:
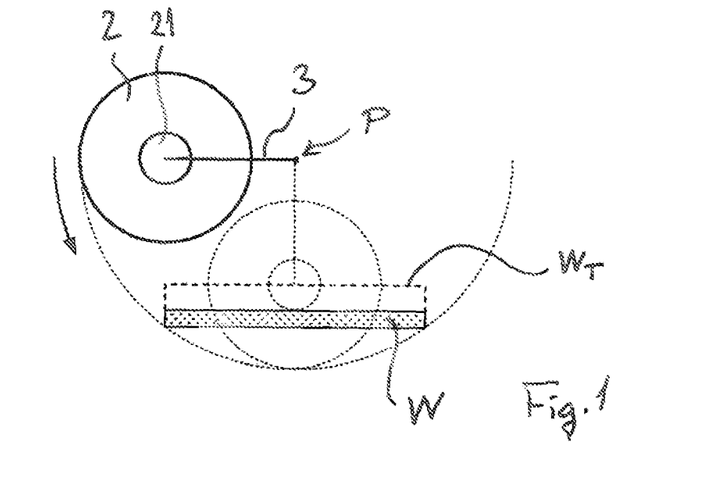
FIG. 1 is a schematic drawing showing the principle of a pendulum saw according to the prior art.

With reference to FIG. 1 it is known to provide a pendulum saw with a circular saw blade 2 mounted on a pendulum arm 3 that during operation swings around a pivot point P. As indicated by the dotted lines, this pendulum saw arrangement is limited to a certain web thickness that allows the saw to cut the lowermost corners of the web W while the hub 21 of the saw blade 2 must be free of the top of the web W when the pendulum saw is at its lowermost position.

If the thickness of the web W is increased as indicated by the dotted line $W_T$ the hub 21 of the circular saw blade 2 cannot pass the web.

Figure 2:
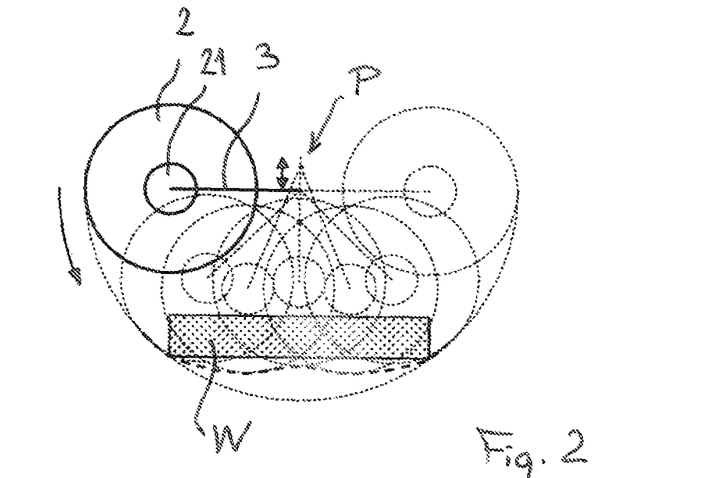
FIG. 2 is a schematic drawing showing the principle of a pendulum saw according to the invention.
Figure 3:
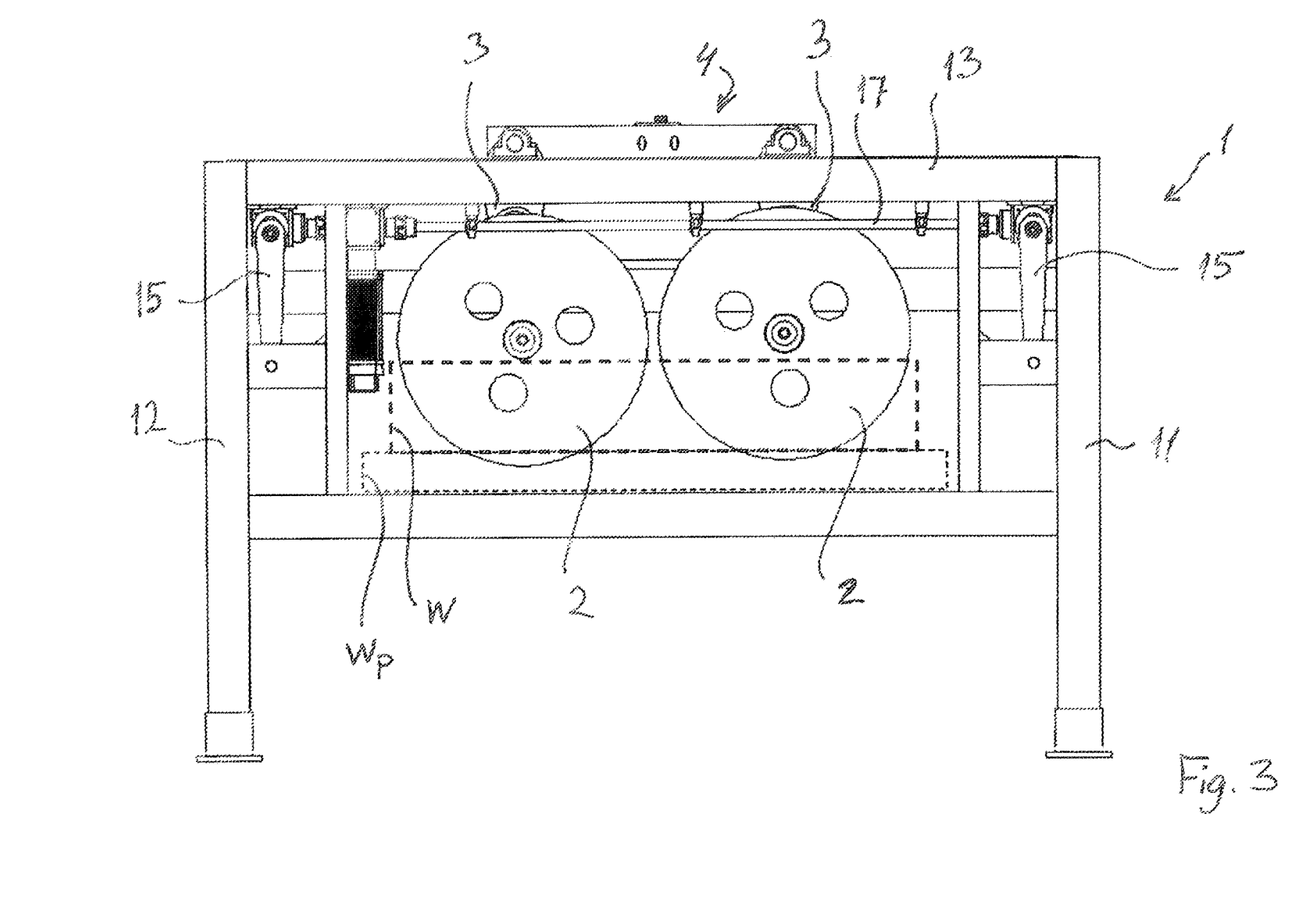
FIG. 3 is a front view of a transverse cutting apparatus according to a preferred embodiment of the invention with the vertically moveable sub-frame in its uppermost position.
Figure 4:
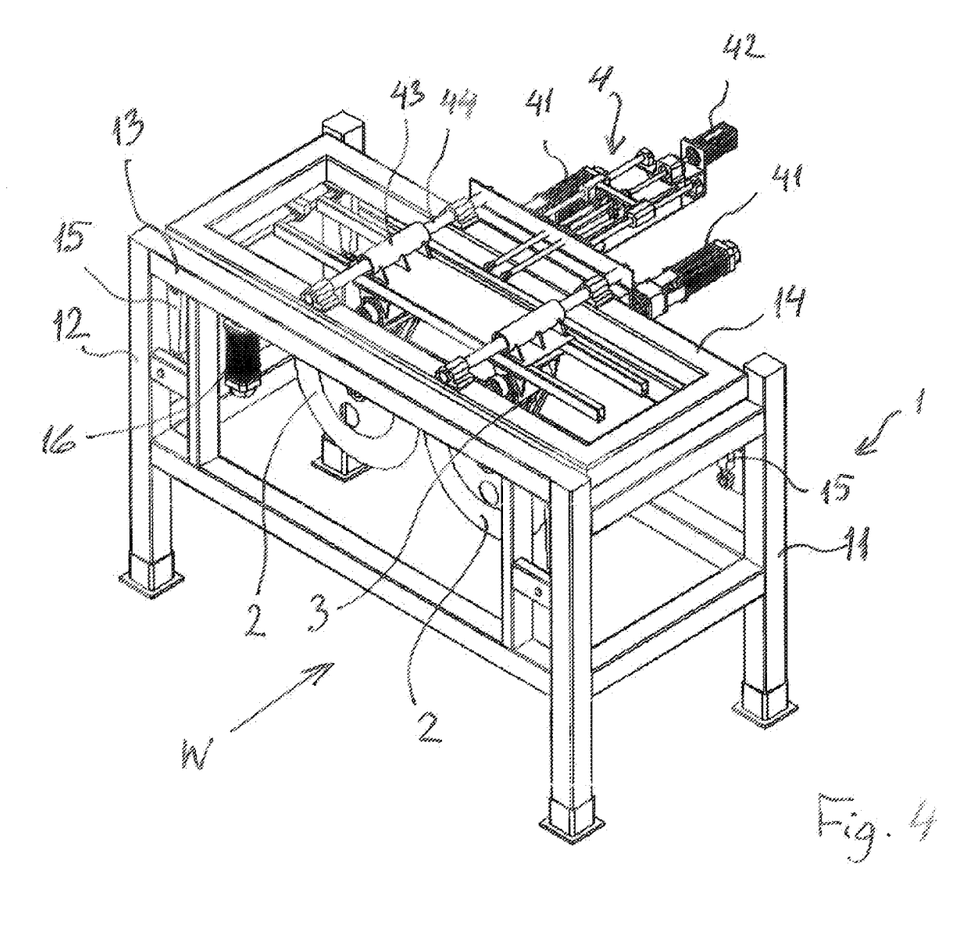
FIGS. 4 to 6 are perspective views of a transverse cutting apparatus according to a preferred embodiment of the invention.
Figure 5:
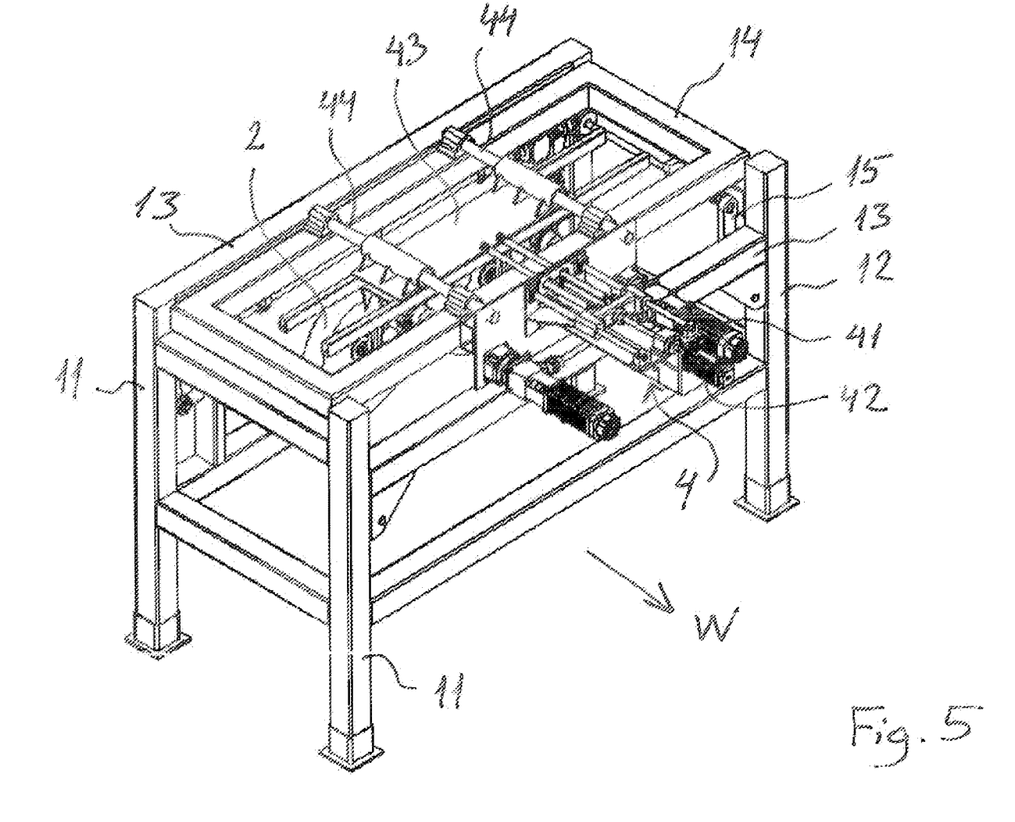
Figure 6:
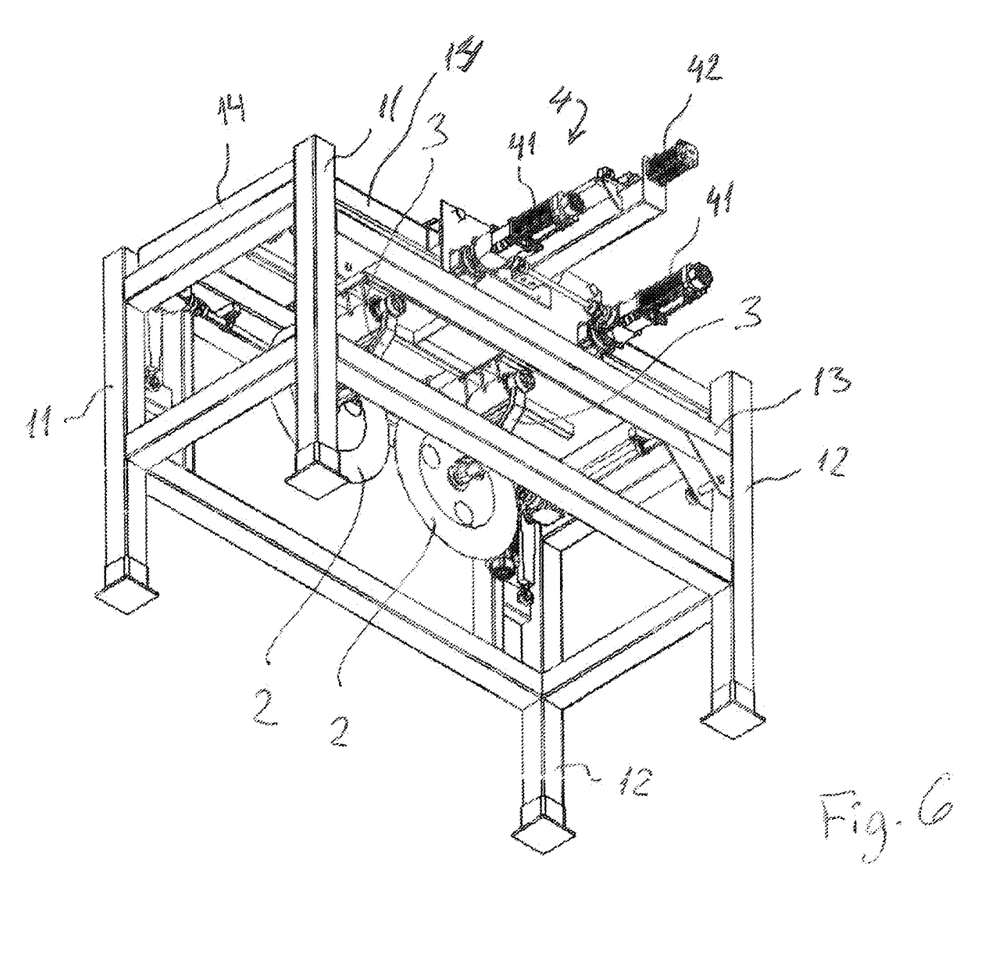
Figure 7:
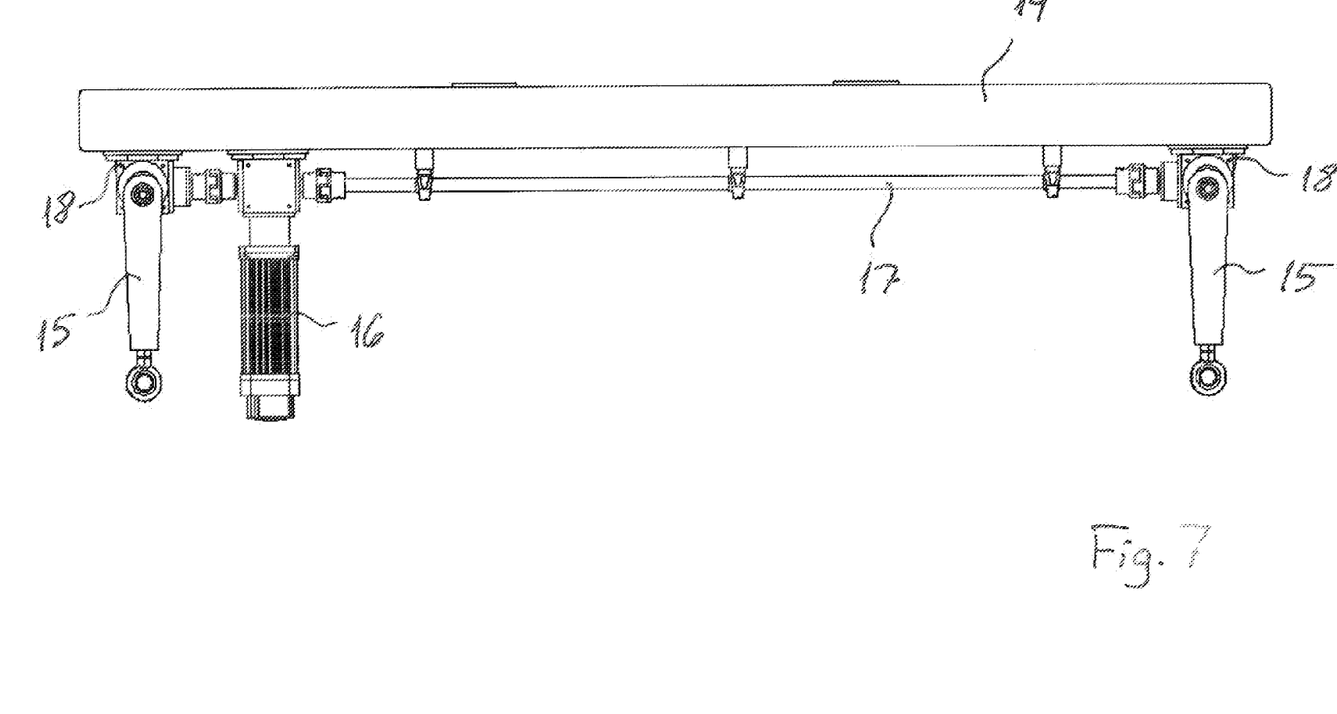
FIGS. 7 and 8 are a side view and a perspective view of the moveable upper frame portion of the apparatus in FIGS. 3-6.
Figure 8:
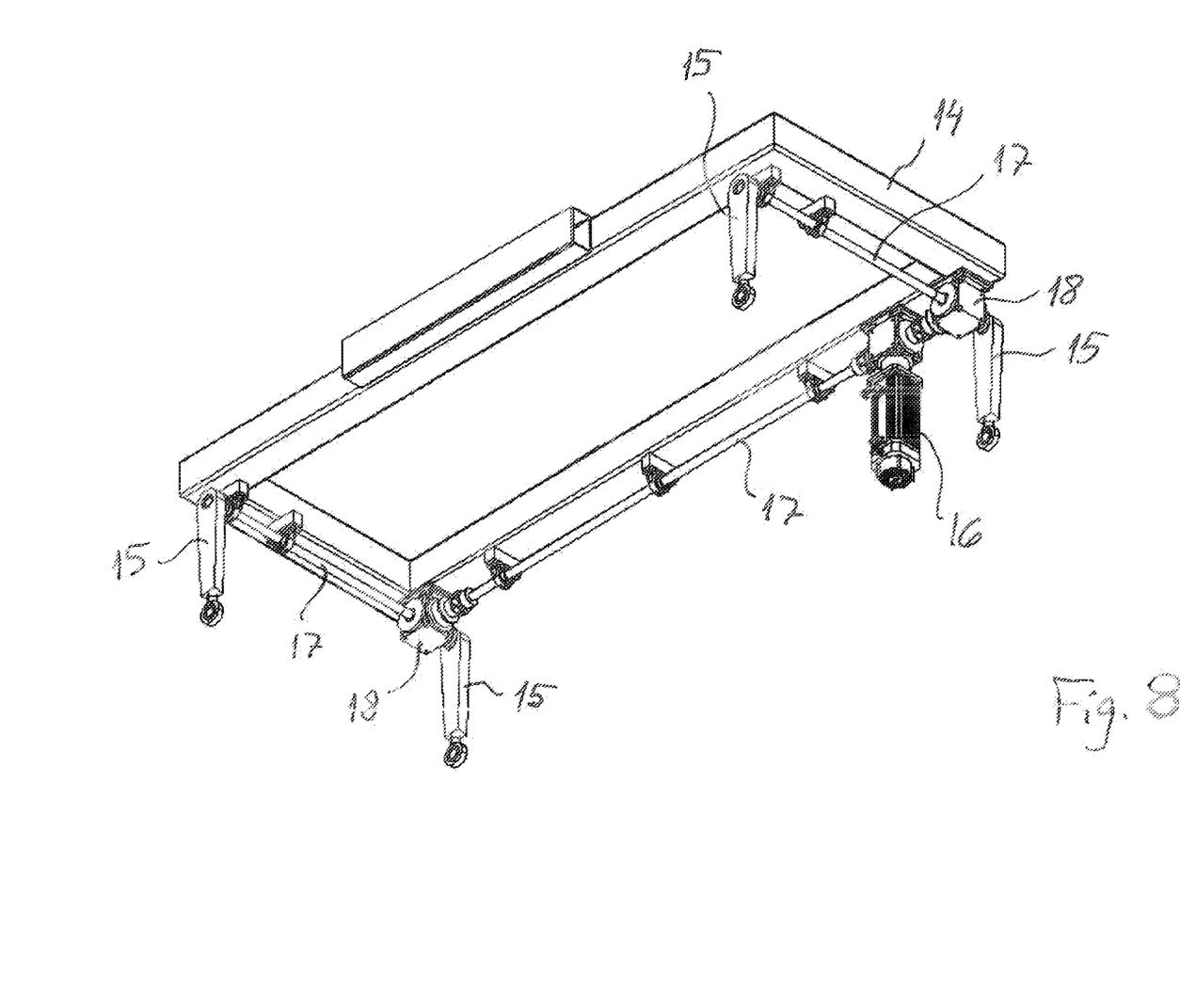
Figure 9:
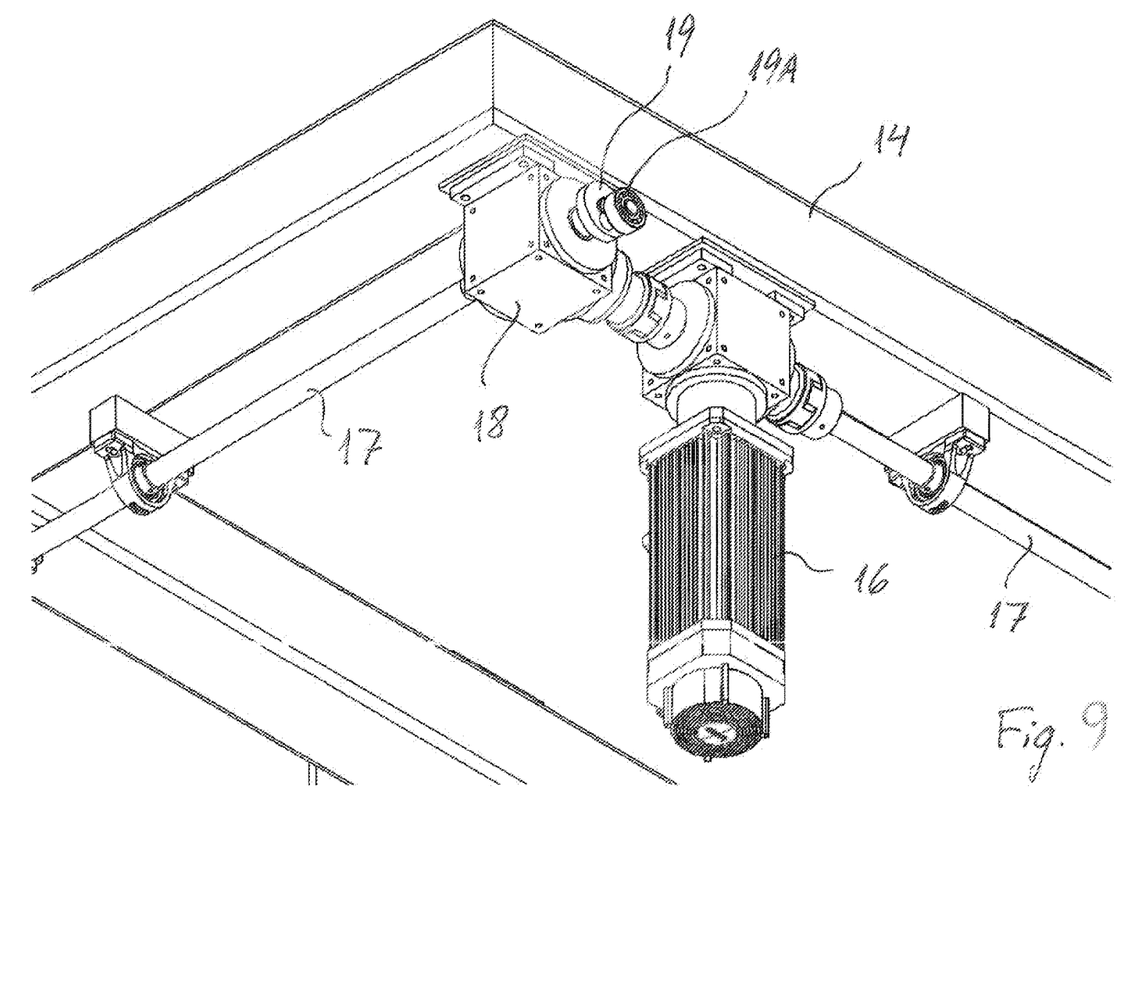
FIG. 9 is a detailed view of a corner of the moveable upper frame.

With reference to FIG. 2, the problem illustrated in FIG. 1 is solved by adding a vertical movement of the pivot point P of the pendulum arm 3 as indicated by the double arrow in the figure. The movement during the swing of the pendulum saw blade 2 is controlled such that as soon as the lowermost corner of the web A has been cut, the pendulum arm 3 is vertically lifted in its pivot point P while the pendulum saw continues the swinging movement so that the hub 21 remains free of the upper surface of the web W in the lowermost position of the saw blade 2. The pivot point P of the pendulum arm 3 is lowered again before the other lowermost corner is reached. In the dotted lines this movement is illustrated in FIG. 2 and compared with the semi-circular movement shown in FIG. 1.

In FIGS. 3 to 9, there is shown a first embodiment of implementing the double movement pendulum saw principally shown in FIG. 2. The transverse cutting apparatus shown in FIGS. 3 to 6 comprises a frame 1 straddling the web path $W_P$ such that the pendulum saw blades 2 are adapted to cut the web W in a substantially orthogonal direction relative to the direction of movement of the web W. The frame 1 comprises a first side frame 11 on one side of the web path $W_P$ and a second side frame 12 on the other side of the web path $W_P$. An upper frame 13 connects the two side frames 11, 12 above the web path $W_P$. At the upper frame 13 a vertically moveable sub-frame 14 is provided from which two pendulum saw arrangements are arranged.

The pendulum saw arrangement includes in this embodiment two circular saw blades 2, each of which is provided on a pendulum arm 3 which is pivotably mounted on the vertically moveable sub-frame 14 of the upper frame 13. Drive means 4 are arranged to control the movement of the pendulum saws 2. This drive means 4 include a swinging drive means 41, such as an electric motor, for each of the pendulum saws 2 for controlling the swinging movement of the saw blades 2. Besides the driving swinging movement of the saws, the drive means 4 also include means for lengthwise displacement during the swing in order to provide an orthogonal transverse cut in a web while the web is moving in the lengthwise direction. This functionality is achieved by suspending the pendulum saws from a shiftable mounting member 43 which is slidably mounted to the upper frame 14 via two parallel guide members 44. The pendulum saws 2, 3 of the saw pendulum arrangement are hereby moveable in the lengthwise direction, i.e. in the direction of the web W (see arrow W in FIGS. 4 and 5). This lengthwise movement is controlled by lengthwise drive means 42, such as an electric motor. By controlling the speed of the swinging movement and the simultaneous lengthwise displacement and the speed of a moving web, the resulting cutting line on the moving web may be controlled to be orthogonal to the web direction.

The moveable sub-frame 14 is mounted to the upper frame 13 via four mounting arms 15 at each of the four corners. The arms are pivotably mounted below to the side frames 11, 12 and at the top to an eccentric mounting tab 19A on the moveable sub-frame 14 (see FIG. 9). The eccentric mounting tab 19A is provided on a distal shaft portion 19 of a corner member 18, which is provided at each corner of the moveable upper frame 14. The distal shaft portion 19 are carrying the eccentric tabs 19A and may be the distal ends of drive shafts 17 connecting the corner members 18 to lifting drive means, such as a servo motor 16 or the like, for driving this motion system. Hereby, when the electric servo motor 16 is activated and the shafts 17 are turned, the eccentric tabs on the four tab members 18 are synchronously moved and thereby displaces the entire moveable sub-frame 14 in an upwards or downwards direction. Hereby, the pendulum saw arrangement is lifted up and down in a controlled manner during the swinging movement in such a manner that the vertically movable sub-frame 14 is at the lowermost position when the swing starts. When the rearmost of the rotating pendulum saw blades 2 has cut through the lower edge of the web, the movable sub-frame 14 is lifted up so that when the pendulum arms 3 of the saw blades 2 are in a vertical position and thereby half way through the swing, the sub-frame 14 is at its uppermost lifted position. The movement of the sub-frame 14 is thereafter reversed so that the second part of the swing minors the first part of the swing.

Above the invention has been described with reference to a preferred embodiment. However, it is realised that variants and equivalents to the preferred embodiments may be provided without departing from the scope of the invention as defined in the accompanying claims.

The invention claimed is:

1. A method of transverse cutting a web on a web path, said method comprising the steps of—providing a web having a thickness; —cutting through the thickness of said web by providing a pendulum swing of a circular saw blade in a cutting path across the web path, wherein said saw blade is suspended on a pendulum arm which is pivotally supported at a pivot point by a sub-frame, said sub-frame being arranged above the web, said saw blade being operative to swing from a first side position where said saw blade does not have contact to the web on the web path to a second side position where said saw blade does not have contact to the web on the web path, and wherein the moveable sub-frame is in a lowermost position when said saw blade is at either the first or the second side positions; —during the cutting step, automatically moving said sub-frame in an upwards direction from the lowermost position to an uppermost position during the pendulum swing of said saw blade and thereby vertically shifting the pivot point of the pendulum arm, while ensuring that said saw blade cuts through the thickness of the web; and wherein the upward movement of said sub-frame from the lowermost position to the uppermost position is coordinated and controlled such that said sub-frame is at the uppermost position when said saw blade is at a lowermost position.

2. A method according to claim 1, further comprising a second circular saw blade provided in a parallel pendulum swing configuration.

3. A method according to claim 1, wherein the web is moving continuously in the length direction of the web path, and the at least one pendulum arm is following the web movement during the swinging, so that said saw blade makes a transversal cut in the continuously moving web.

4. A method according to claim 1, wherein the cutting path is substantially orthogonal to the web path.

* * * * *